(12) United States Patent
Zuber et al.

(10) Patent No.: US 7,681,036 B1
(45) Date of Patent: Mar. 16, 2010

(54) FAIL-SAFE TRANSMISSION OF MULTIPLE INDEPENDENT LEVELS OF SECURITY USING STANDARD DATA BUSSES APPARATUS AND METHOD

(75) Inventors: Eric O. Zuber, South Amana, IA (US); Dipak P. Patel, Cedar Rapids, IA (US); Robert R. Jakoubek, Huntsville, AL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1276 days.

(21) Appl. No.: 10/643,451

(22) Filed: Aug. 19, 2003

Related U.S. Application Data

(63) Continuation of application No. 10/229,877, filed on Aug. 28, 2002.

(51) Int. Cl.
*H04L 29/06* (2006.01)
(52) U.S. Cl. ...................................... 713/166
(58) Field of Classification Search .................. 713/166
See application file for complete search history.

(56) References Cited

U.S. PATENT DOCUMENTS

| | | | | |
|---|---|---|---|---|
| 5,075,884 A | * | 12/1991 | Sherman et al. ................ | 726/4 |
| 5,960,344 A | * | 9/1999 | Mahany .................... | 455/432.2 |
| 5,991,642 A | * | 11/1999 | Watanabe et al. ........... | 455/560 |
| H1836 H | * | 2/2000 | Fletcher et al. ............. | 455/433 |
| 6,041,035 A | * | 3/2000 | Thedens ..................... | 370/217 |
| 6,101,255 A | * | 8/2000 | Harrison et al. ............... | 380/52 |
| 6,944,475 B1 | * | 9/2005 | Campbell ................ | 455/553.1 |
| 2002/0163920 A1 | * | 11/2002 | Walker et al. ............... | 370/401 |
| 2004/0052372 A1 | * | 3/2004 | Jakoubek .................... | 380/255 |

* cited by examiner

*Primary Examiner*—Kambiz Zand
*Assistant Examiner*—Jason K Gee
(74) *Attorney, Agent, or Firm*—Matthew J. Evans; Daniel M. Barbieri

(57) ABSTRACT

A multi-channel radio operating with multiple security levels is disclosed. The multi-channel radio includes more than one input/output. Each of the input/outputs corresponds to a security level. The radio also includes a first common bus coupled to the more than one input/output and a first set of more than one processor coupled to the common bus. Each of the first set of processors corresponds to a security level. Further, the radio includes a second set of more than one processors coupled to the first set of processors and more than one transceiver. Each transceiver is coupled to at least one of the processors of the first set of processors.

14 Claims, 14 Drawing Sheets

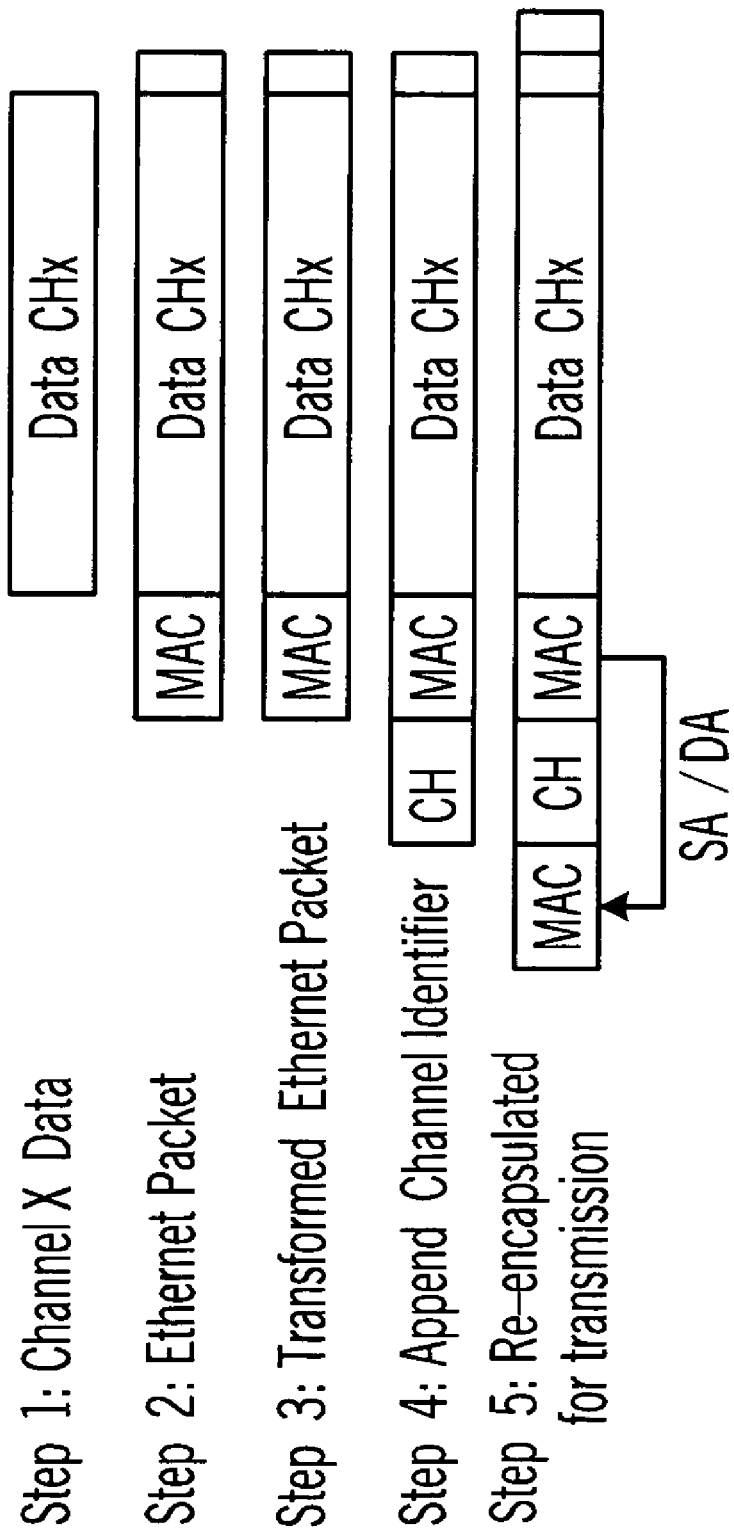

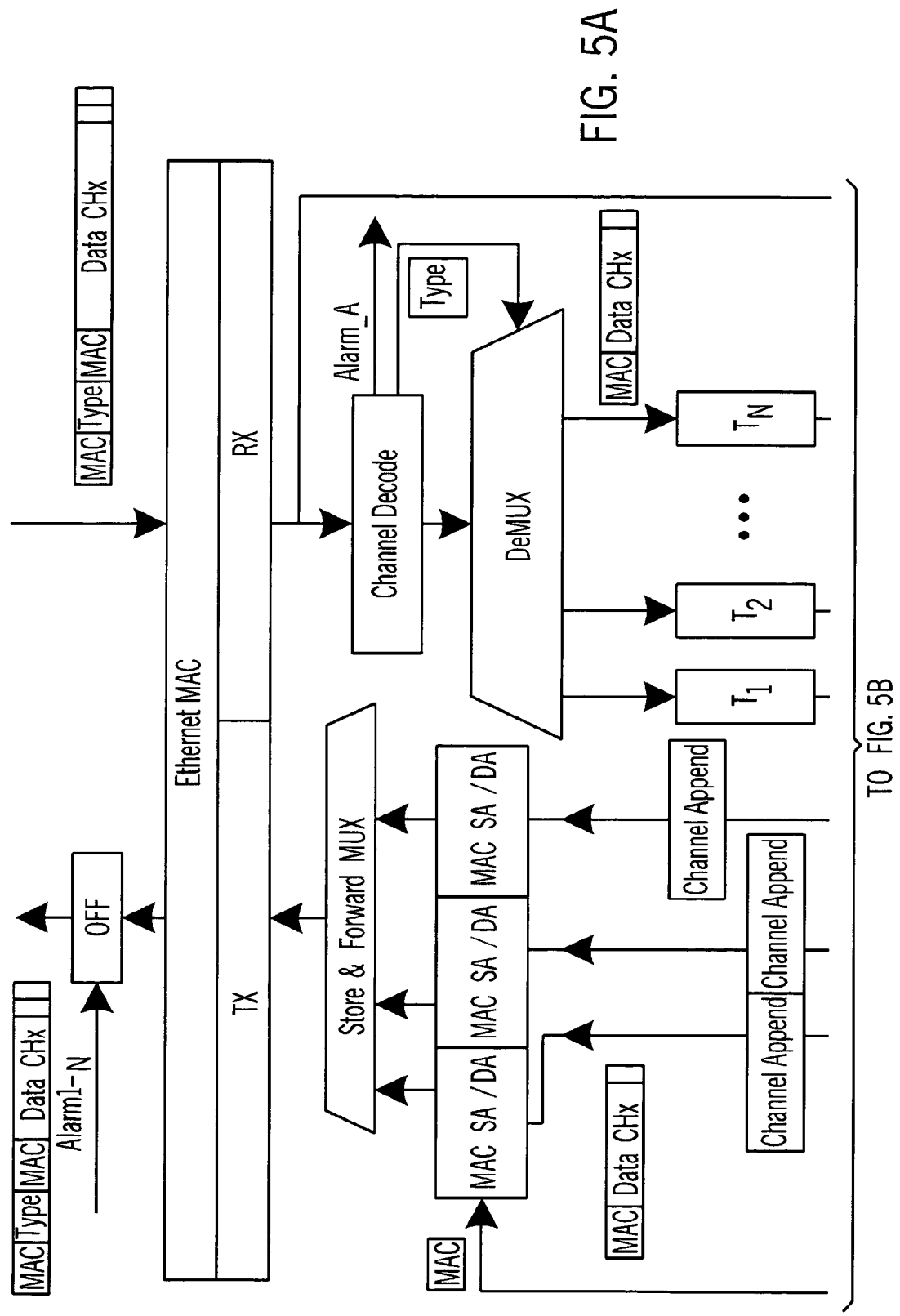

FAIL-SAFE TRANSMISSION OF MULTIPLE INDEPENDENT LEVELS OF SECURITY USING STANDARD DATA BUSSES APPARATUS AND METHOD

This application is a continuation of pending U.S. Ser. No. 10/229,877, filed Aug. 28, 2002, entitled "Software Radio System and Method."

STATEMENT REGARDING FEDERALLY SPONSORED RESEARCH OR DEVELOPMENT

The invention was made with U.S. Government support under contract no. DAAB07-02-C-C403 and the U.S. Government has certain rights in this invention.

BACKGROUND

The disclosure relates generally to the field of multichannel radio systems. Further, the disclosure relates to modular multichannel radio systems that may be used in military applications. Further still, the disclosure relates to a multichannel software radio system in which a single network interface may be used for interconnecting channel processors to user input/outputs (I/O) and a single PCI interface to the cryptographic device.

In conventional multichannel radio systems, the lack of isolation between red side processors prevents the processing of information that must remain separate for reasons of security. Accordingly, conventional multichannel radio systems using Multiple Independent Levels of Security (MILS) in which a single multi-channel radio communications system provides voice and data services to multiple users each operating at independent security levels, hardware embodying separate security level paths may be implemented.

Accordingly, there is a need for a software radio architecture which includes consolidation of data transfer mechanisms providing both simplicity and economy, and further having the potential to use commercial off the shelf data bus standards while maintaining isolation between processors and channels.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the above-mentioned needs.

SUMMARY

An example of the invention relates to a multi-channel radio operating with multiple security levels. The multi-channel radio comprises more than one input/output. Each input/output corresponds to a security level. The multi-channel radio comprises a first common bus coupled to the more than one input/output and a first set of more than one processor coupled to the common bus. Each of the first set of processors corresponds to a security level. The multi-channel radio comprises a second set of more than one processor coupled to the first set of processors. The multi-channel radio also comprises more than one transceiver. Each transceiver is coupled to at least one of the processors of the first set of processors.

Another example of the invention relates to a method of transmitting data using a multi-channel radio system that is configured for use with different security levels. The method comprises receiving an information packet and routing the information packet to a processor of a first set of processors. Each of the first set of processors corresponds to a security level. The routing is carried out over a first common bus. The method also includes encoding the information packet and routing the information packet by a second common bus to one of a second set of processors. The method further includes transmitting the information packet from one of the second set of processors over the air.

Another example of the invention relates to a method of receiving data using a multi-channel radio system configured for use with different security levels. The method comprises receiving an information packet from over the air and routing the information packet to a processor of a first set of processors. The method also comprises routing the information packet over a first common bus to one of a second set of processors based on the security level of the information packet. Further still, the method comprises decoding the information packet and routing the information packet by a second common bus to one of a set of outputs. Each output corresponds to a security level.

Further still, an example of the invention relates to a multi-channel radio receiving information of different security levels. The multi-channel radio comprises a first set of processors and a second set of processors. Each of the second set of processors corresponds to a security level. The multi-channel radio also comprises a common bus interface coupled between the first set of processors and a second set of processors. The interface is configured to isolate processors of the second set of processors from one another based on the information security level.

Alternative examples and other exemplary embodiments relate to other features and combinations of features as may be generally recited in the claims.

BRIEF DESCRIPTION OF THE DRAWINGS

The invention will become more fully understood from the following detailed description taken in conjunction with the accompanying drawings wherein like reference numerals refer to like elements, in which:

FIG. 4 is an exemplary depiction of an ethernet package encapsulation;

DETAILED DESCRIPTION OF PREFERRED AND EXEMPLARY EMBODIMENTS

Figure 1:
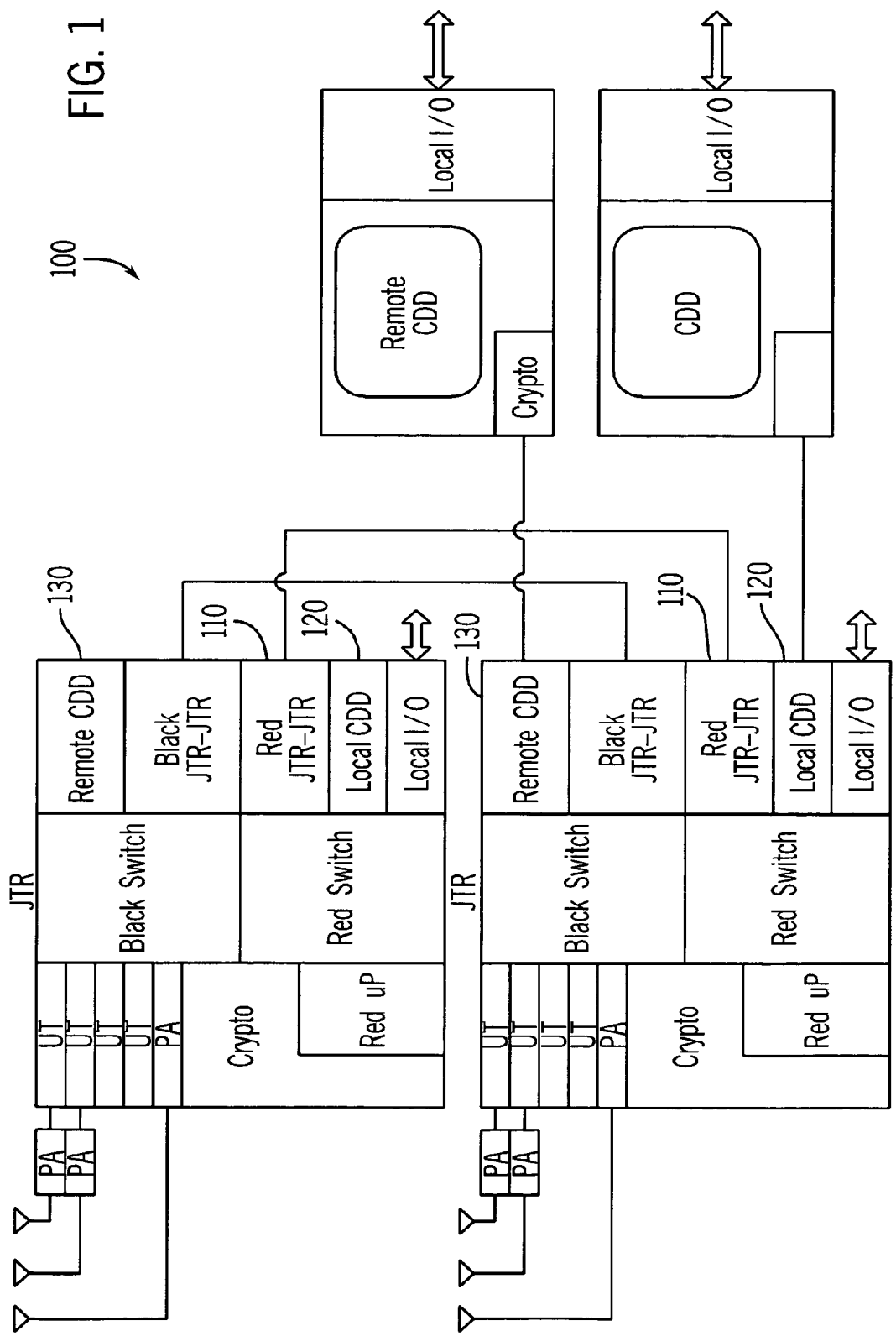
FIG. 1 is an exemplary depiction of a Joint Tactical Radio (JTR) System configuration.

Before describing in detail the particular improved system and method, it should be observed that the invention includes, but is not limited to a novel structural combination of conventional data/signal processing components and communication circuits, and not in the particular detailed configurations thereof. Accordingly, the structure methods, functions, control, and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language and the claims.

Military radio systems including the Joint Tactical Radio System (JTRS) Cluster 1 system may have several external interfaces from sub-elements of the system which need to be capable of transporting data and control with varying security classification levels. The requirements and goals of the system specify these interfaces to be open standard interfaces. An exemplary high level block diagram of the JTR system 100 is shown in FIG. 1. The interfaces which may need to be capable of supporting multiple levels of secure data and control traffic are the Red JTR-JTR interface 110, the Local Control Display Device (CDD) interface 120 and the Remote CDD interface 130. Remote CDD interface 130 may be a fiber-optic interface while the Local CDD and JTR-JTR interfaces may be any of a variety of interfaces. It may be desirable to make a single MSLS transport mechanism that will satisfy all of these interfaces.

Figure 2A:
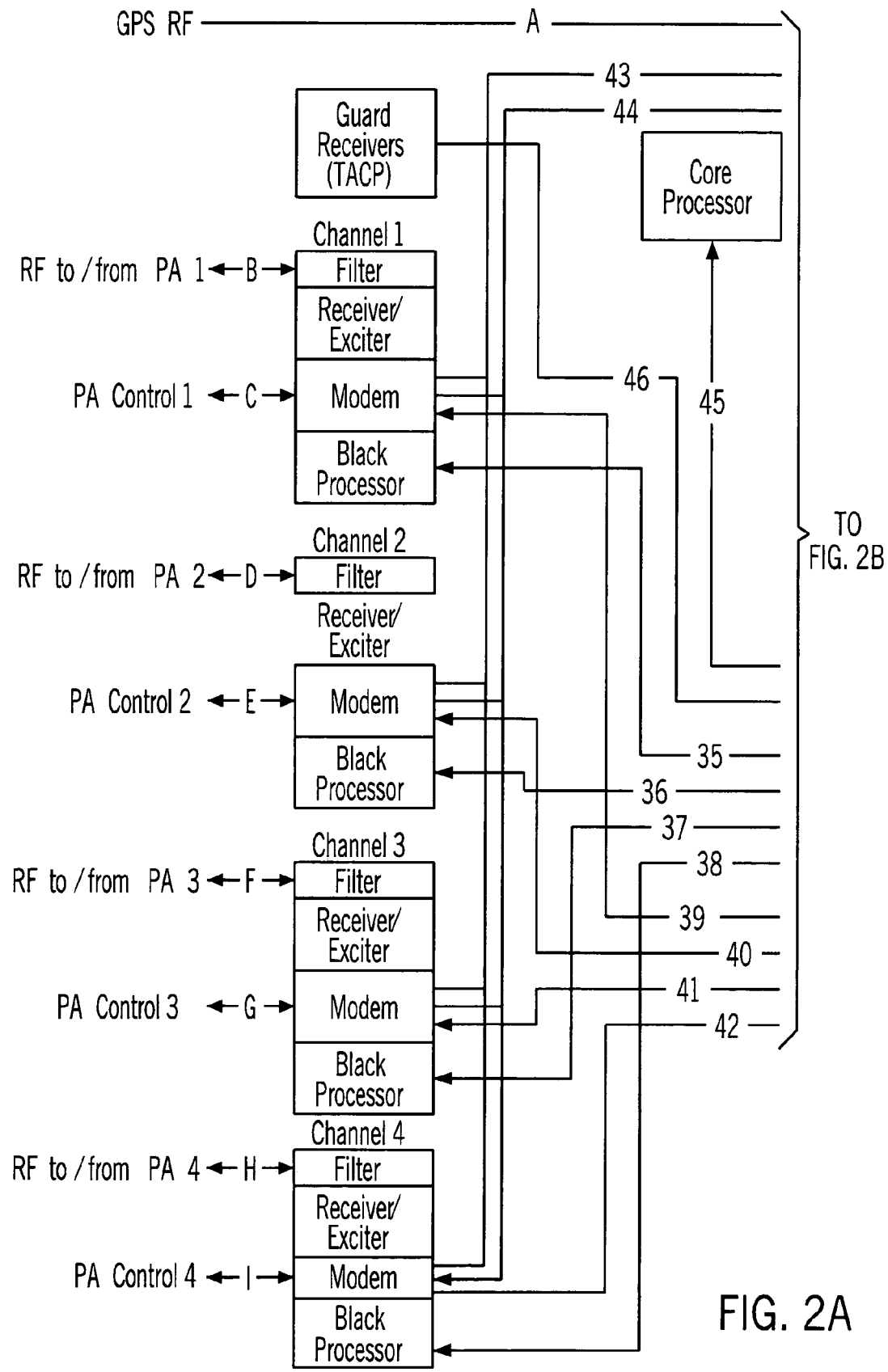
FIG. 2 is an exemplary block diagram of a joint tactical radio node.
Figure 2B:
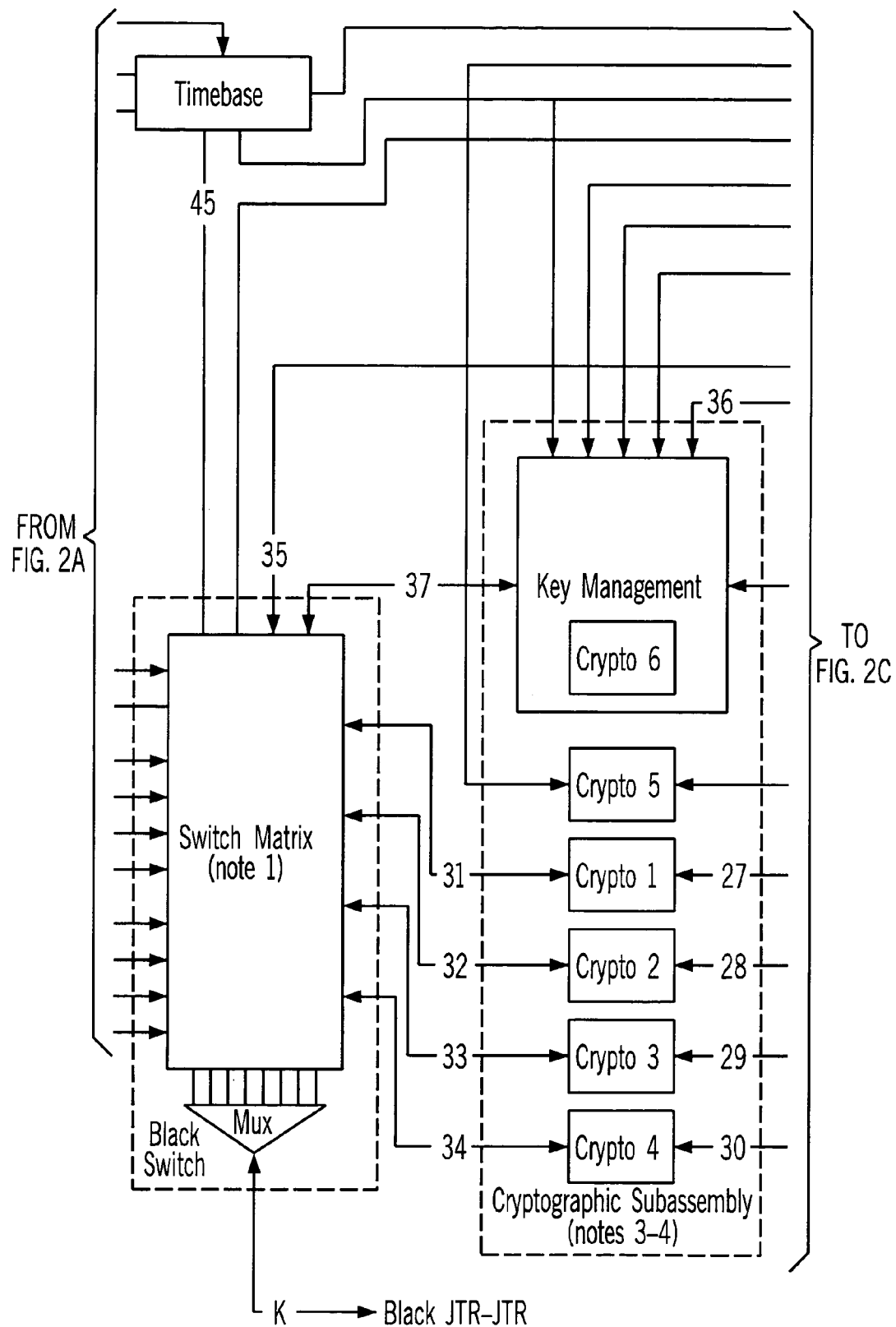
Figure 2C:
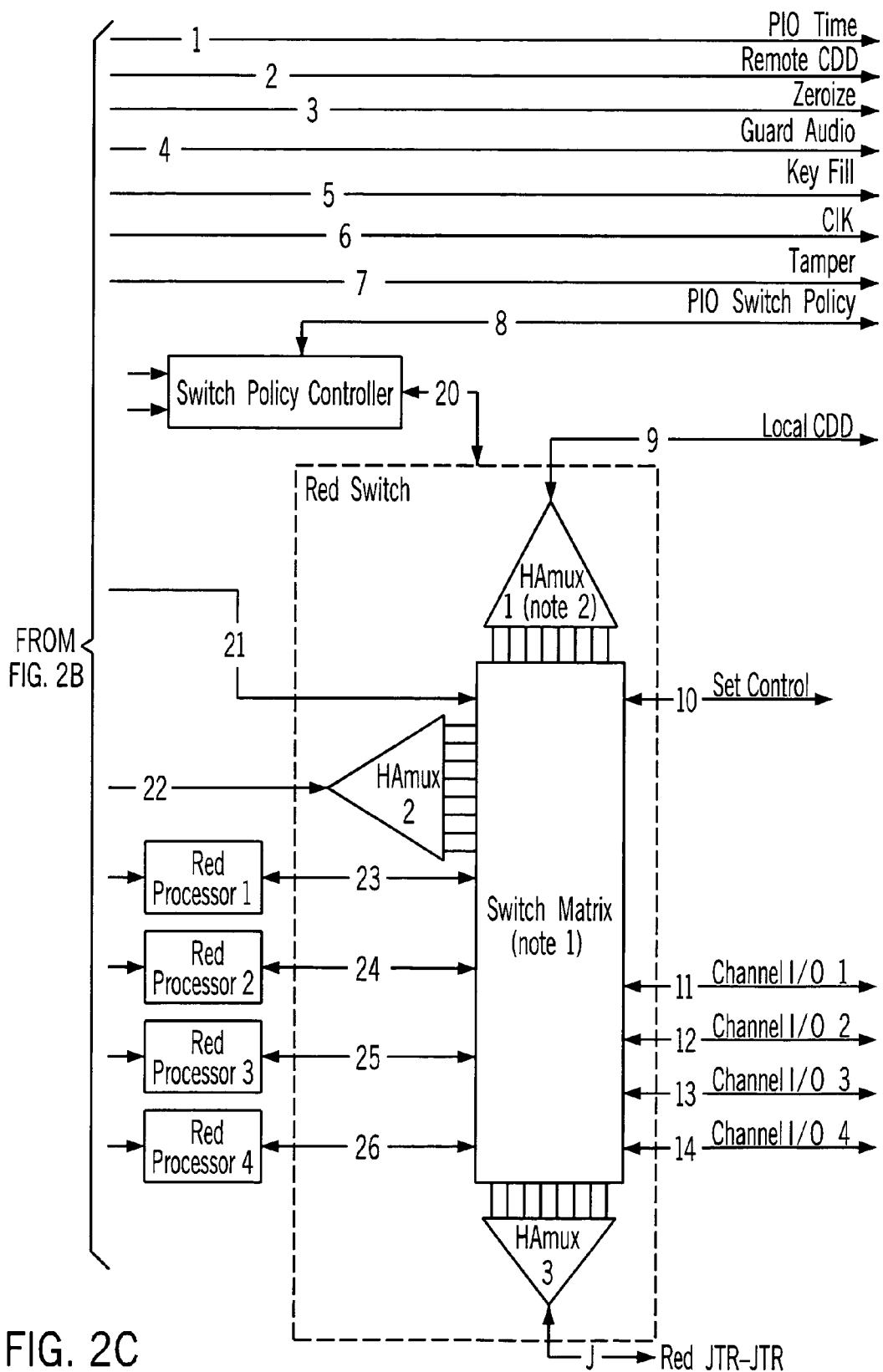

A detailed block diagram of the Network INFOSEC Unit (NIU) is shown in FIG. 2. The NIU provides all of the red JTR functionality as well as the black side crypto, black switch, black JTR-JTR and remote CDD functionality. High Assurance Mux (HAMUX) elements are highlighted in the figure and are elements in which at least some of the inventive concepts may be applied.

HAMux devices are responsible for providing independent security level networking capabilities between the individual local Red Waveform Processors and external resources. For the JTR-JTR interface, the HAMux must provide up to four independent processor to processor connections and multiple (TBD depending on exact interface specifications) I/O channel cross connections. The processor interconnections may provide the independent networking capability and the I/O interconnections allow user I/O ports from one JTR to be used by waveforms running on the other JTR. For the remote and local CDD interfaces, the HAMux provides security level independent connectivity between the local Red Processors and the user interfaces on the CDDs. Both connections also allow an independent control/status network layer to exist independent of the user data traffic.

To reduce external pin-count, especially in the case of the remote CDD which can be located as much as 4000 m away, a single serial bus is desired to provide the interconnections and networking capabilities described. Use of an industry standard interface may both be required by certain specifications and desired from a cost and test standpoint.

Ethernet is currently one of the most widely used networking standards in the world. Ethernet is defined in the IEEE 803.2 standard which provides all of the physical and media access control (MAC) layer definitions. The standard provides scalable bandwidth from 1 Mbps to 100 Mbps over a variety of physical media using a common MAC layer interface. Most Ethernet physical layer implementations are also defined to operate in harsh environments and in the presence of electromagnetic interference making the standard well suited to the JTR military environment.

Figure 3:
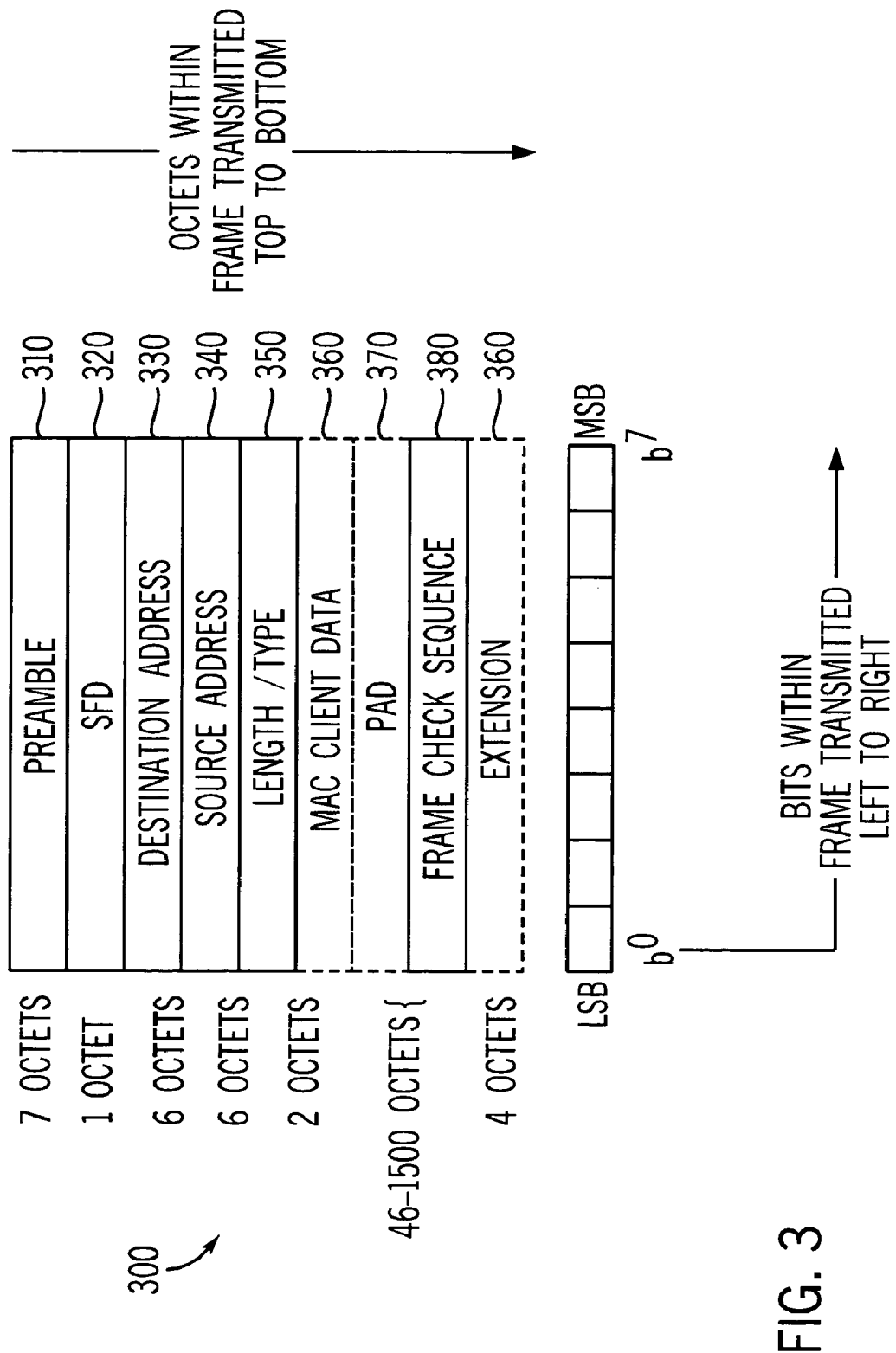
FIG. 3 is an exemplary depiction of a MAC frame format.

Referring now to FIG. 3, the nine fields of a frame 300: the preamble 310, Start Frame Delimiter (SFD) 320, the addresses of the frame's source 330 and destination 340, a length or type field 350 to indicate the length or protocol type of the following field that contains the MAC Client data 360, a field that contains padding 370 if required, the frame check sequence field 380 containing a cyclic redundancy check value to detect errors in a received frame, and an extension field 390 if required (for 1000 Mb/s half duplex operation only). Of these nine fields, all are of fixed size except for the data, pad, and extension fields, which may contain an integer number of octets between the minimum and maximum values that are determined by the specific implementation of the CSMA/CD MAC.

The preamble field may be a 7-octet field that is used to allow the PLS circuitry to reach its steady-state synchronization with the received frame's timing.

The SFD field is the sequence 10101011. It immediately follows the preamble pattern and indicates the start of a frame.

Each MAC frame shall contain two address fields: the Destination Address field 330 and the Source Address field 340, in that order. The Destination Address field 330 shall specify the destination addressee(s) for which the frame is intended. The Source Address field 340 shall identify the station from which the frame was initiated. The representation of each address field shall be as follows:

Each address field shall be 48 bits in length.

The first bit (LSB) shall be used in the Destination Address field as an address type designation bit to identify the Destination Address either as an individual or as a group address. If this bit is 0, it shall indicate that the address field contains an individual address. If this bit is 1, it shall indicate that the address field contains a group address that identifies none, one or more, or all of the stations connected to the LAN. In the Source Address field, the first bit is reserved and set to 0.

The second bit shall be used to distinguish between locally or globally administered addresses. For globally administered (or U, universal) addresses, the bit is set to 0. If an address is to be assigned locally, this bit shall be set to 1. Note that for the broadcast address, this bit is also a 1.

Each octet of each address field shall be transmitted least significant bit first.

The Destination Address field specifies the station(s) for which the frame is intended. It may be an individual or multicast (including broadcast) address.

The Source Address field specifies the station sending the frame. The CSMA/CD MAC sublayer does not interpret the Source Address field.

Length/type field 350 is a two-octet field taking one of two meanings, depending on its numeric value. For numerical evaluation, the first octet is the most significant octet of this field.

If the value of this field is less than or equal to the value of maxValidFrame, then the Length/Type field indicates the number of MAC client data octets contained in the subsequent data field of the frame.

If the value of this field is greater than or equal to 1536 decimal (equal to 0600 hexadecimal), then the Length/Type field indicates the nature of the MAC client protocol. The Length and Type interpretations of this field are mutually exclusive. When used as a Type field, it is the responsibility of the MAC client to ensure that the MAC client operates properly when the MAC sublayer pads the supplied data.

Regardless of the interpretation of the Length/Type field 350, if the length of the data field is less than the minimum required for proper operation of the protocol, a PAD field (a sequence of octets) will be added at the end of the data field but prior to the FCS field. The Length/Type field is transmitted and received with the high order octet first.

The data field contains a sequence of n octets. Full data transparency is provided in the sense that any arbitrary sequence of octet values may appear in the data field up to a maximum number specified by the implementation of the standard that is used. A minimum frame size is required for correct CSMA/CD protocol operation and is specified by the particular implementation of the standard. If necessary, the data field is extended by appending extra bits (that is, a pad) in units of octets after the data field but prior to calculating and appending the FCS. The size of the pad, if any, is determined by the size of the data field supplied by the MAC client and the minimum frame size and address size parameters of the particular implementation. The maximum size of the data field is determined by the maximum frame size and address size parameters of the particular implementation. The length of PAD field required for MAC client data that is n octets long is max [0, minFrameSize−((8×n+2×addressSize+48)] bits. The maximum possible size of the data field is maxUntaggedFrameSize−(2×addressSize+48)/8 octets.

A cyclic redundancy check (CRC) may be used by the transmit and receive algorithms to generate a CRC value for the FCS field. The frame check sequence (FCS) field contains a 4-octet (32-bit) cyclic redundancy check (CRC) value. This value is computed as a function of the contents of the source address, destination address, length, LLC data and pad (that is, all fields except the preamble, SFD, FCS, and extension). The encoding is defined by the following generating polynomial.

$$G(x)=x^{32}+x^{26}+x^{23}+x^{22}+x^{16}+x^{12}+x^{11}+x^{10}+x^8+x^7+x^5+x^4+x^2+x+1$$

Mathematically, the CRC value corresponding to a given frame is defined by the following procedure:
The first 32 bits of the frame are complemented.
The n bits of the frame are then considered to be the coefficients of a polynomial M(x) of degree n−1. (The first bit of the Destination Address field corresponds to the $x^{(n-1)}$ term and the last bit of the data field corresponds to the $x^0$ term.)
M(x) is multiplied by $x^{32}$ and divided by G(x), producing a remainder R(x) of degree 31.
The coefficients of R(x) are considered to be a 32-bit sequence.
The bit sequence is complemented and the result is the CRC.
The 32 bits of the CRC value are placed in the frame check sequence field so that the $x^{31}$ term is the left-most bit of the first octet, and the $x^0$ term is the right most bit of the last octet. (The bits of the CRC are thus transmitted in the order $x^{31}, x^{30}, \ldots, x^1, x^0$)

Extension field 360 follows the FCS field, and is made up of a sequence of extension bits, which are readily distinguished from data bits. The length of the field is in the range of zero to (slotTime-minFrameSize) bits, inclusive. The contents of Extension field are not included in the FCS computation.

The Extension field may have a length of greater than zero under the conditions that are described in IEEE 802.3 Section 4.2.3.4. The length of the Extension field will be zero under all other conditions. Implementations defined in IEEE 802.3 Section 4.4.2 may ignore this field altogether if the number of bit times in the slotTime parameter is equal to the number of bits in the minFrameSize parameter.

The data encapsulation concept for using ethernet to transport MSLS data is shown in FIG. 4. The first step illustrates the data to be transported. This data is then formatted into an Ethernet packet with the MAC layer header and packet CRC as illustrated in step 2. Step 3 illustrates the beginning of the encapsulation process for fail safe transport of the data. The Ethernet packet from step 2 is transformed using a linear process which is unique for each independent channel to be transported using the Ethernet link. The transform is envisioned to be an XOR with an psuedo-random number (PN) where each channel has a different and unique PN sequence. Step 4 appends a channel ID to the transformed packet to aid in routing on the receive side of the link. The final step creating a new Ethernet packet for transmission by appending the original source and destination MAC address from step 2 and calculating a new CRC for the packet. This message is then sent using standard Ethernet MAC layer 2 packet routing procedures to the desired destination.

Figure 5B:
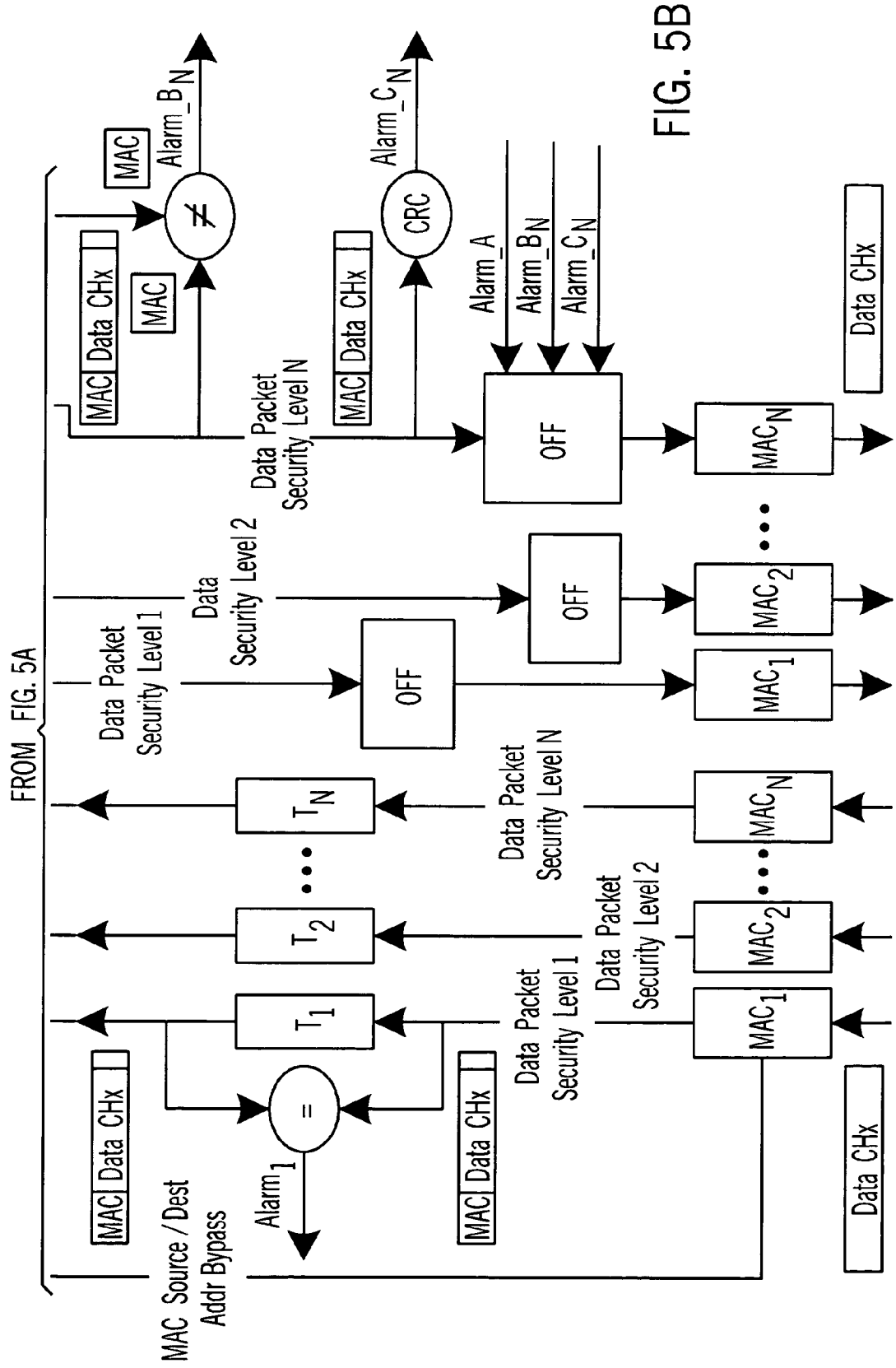
FIG. 5 is an exemplary depiction of a Joint Tactical Radio node.

The block diagram for the implementation of the data encapsulation is shown in FIG. 5.

Starting with the transmit side, the data enters from the bottom left. The number of channels implemented is scalable as shown in the figure from 1 to N. Typical implementations may have 4 to 10 channels for Cluster 1. Each data input can be at an arbitrary security level up to Secret. The Ethernet MAC layer circuits encapsulate the data into datagrams by appending the header information and the CRC for the datagram. The Source and Destination addresses are forwarded up the chain for inclusion in the final header.

In the next step, each channel has an independent Transform block denoted $T_1, T_2 \ldots$ which provides a PN overlay of the original datagram. The transforms are designed such that data encoded in one channel cannot be decoded by any of the other channels. A fault detection circuit may check for 'stuck at' faults in the PN generation and overlay and generates an alarm if the transform output is equal to the transform input. The Alarm immediately shuts down transmission on the output of the transmit circuitry. The shutdown circuit consists of N series connected on-off circuit switches each controlled by the corresponding $Alarm_n$ signal. An alarm on any one of the channels will shut down the entire transmit chain.

The next block appends the Channel ID at the head of the datagram. The Channel ID is a constant byte long identifier which is unique for each channel. Finally the Ethernet header for the datagram is appended using the original source and destination addresses which were forwarded by the first MAC block. A new CRC is appended to the end of the datagram and the datagram is then combined with the datagrams from the other channels for transmission over the MSLS Ethernet link.

The receive subsystem begins with a MAC layer Ethernet receive interface which checks the CRC of the incoming datagram and discards it if the CRC is invalid. This prevents data corruption in the transmission channel from triggering inadvertent alarms in the subsequent receive circuitry. The Source and Destination addresses are forwarded down the receive chain for checking with the original after translation.

The Channel ID is then removed from the data-gram, checked for errors and then used to select the destination of the demux circuit. Detection of an invalid Channel ID will generate an Alarm. The demux then switches the data to the selected channel. The data then passes through the inverse transform process of the transmit channel to recover the data. Again, each channel has a different transform/inverse transform pair so data erroneously cross-channeled due to mux/demux errors will not emerge from the inverse transform intact.

Error detection circuits now checks the Source and Destination addresses of the datagram emerging from the transform circuit to the Source and Destination address of the datagram originally received to detect and also checks the CRC of the recovered datagram to detect mux/demux failures. Invalid CRC or mismatch of address will generate an Alarm. As in the transmit chain, an alarm on any receive channel will disable the entire receive chain through a set of series connected switches.

Figure 6:
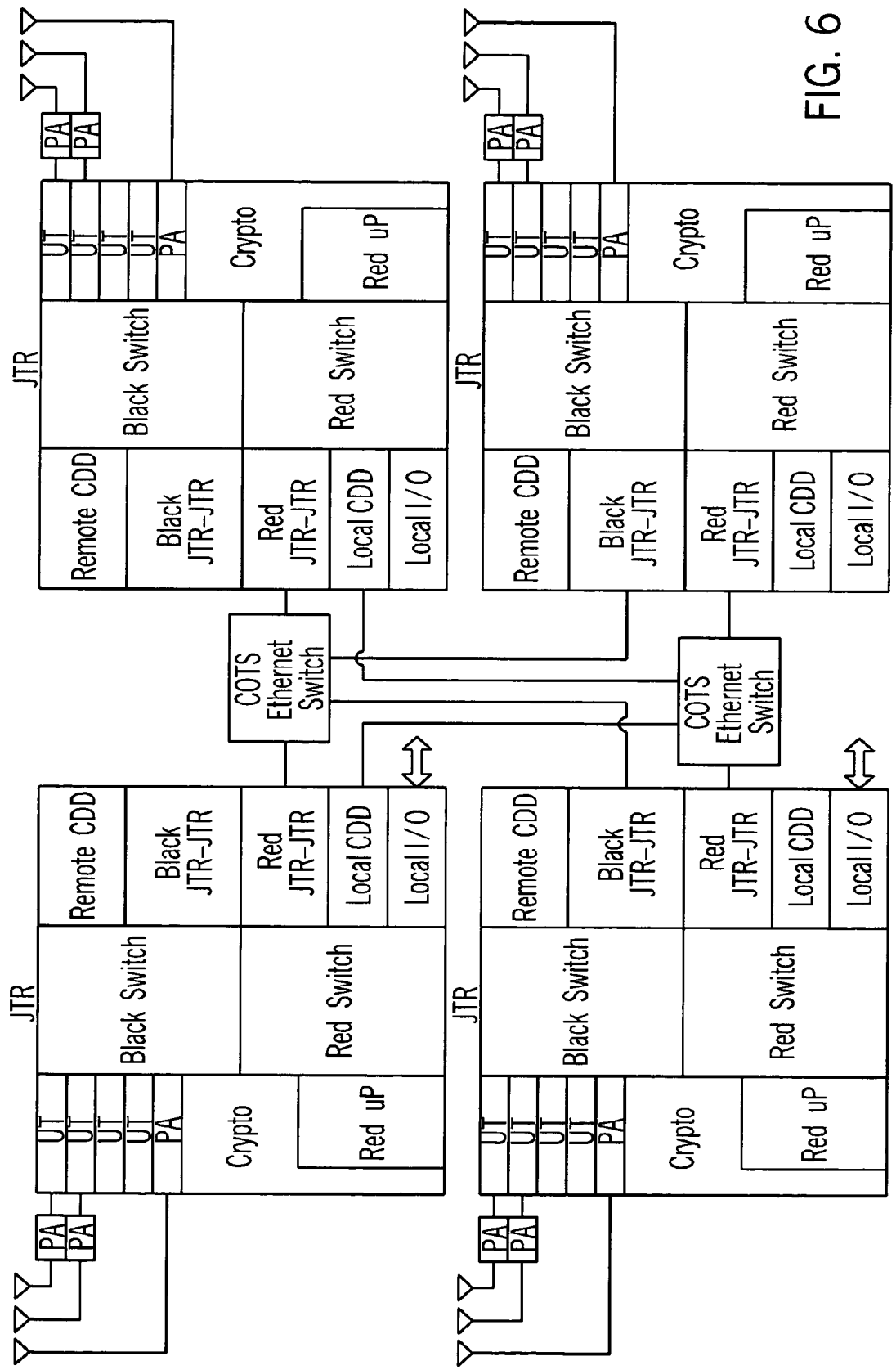
FIG. 6 is an exemplary depiction of an alternative connection for Joint Tactical Radio nodes.

Inter-operation of more than 2 JTRs, as depicted in FIG. 6, allow configuration with greater than 8 channels. Inclusion of switches does not impact MSLS design robustness of link.

Figure 7:
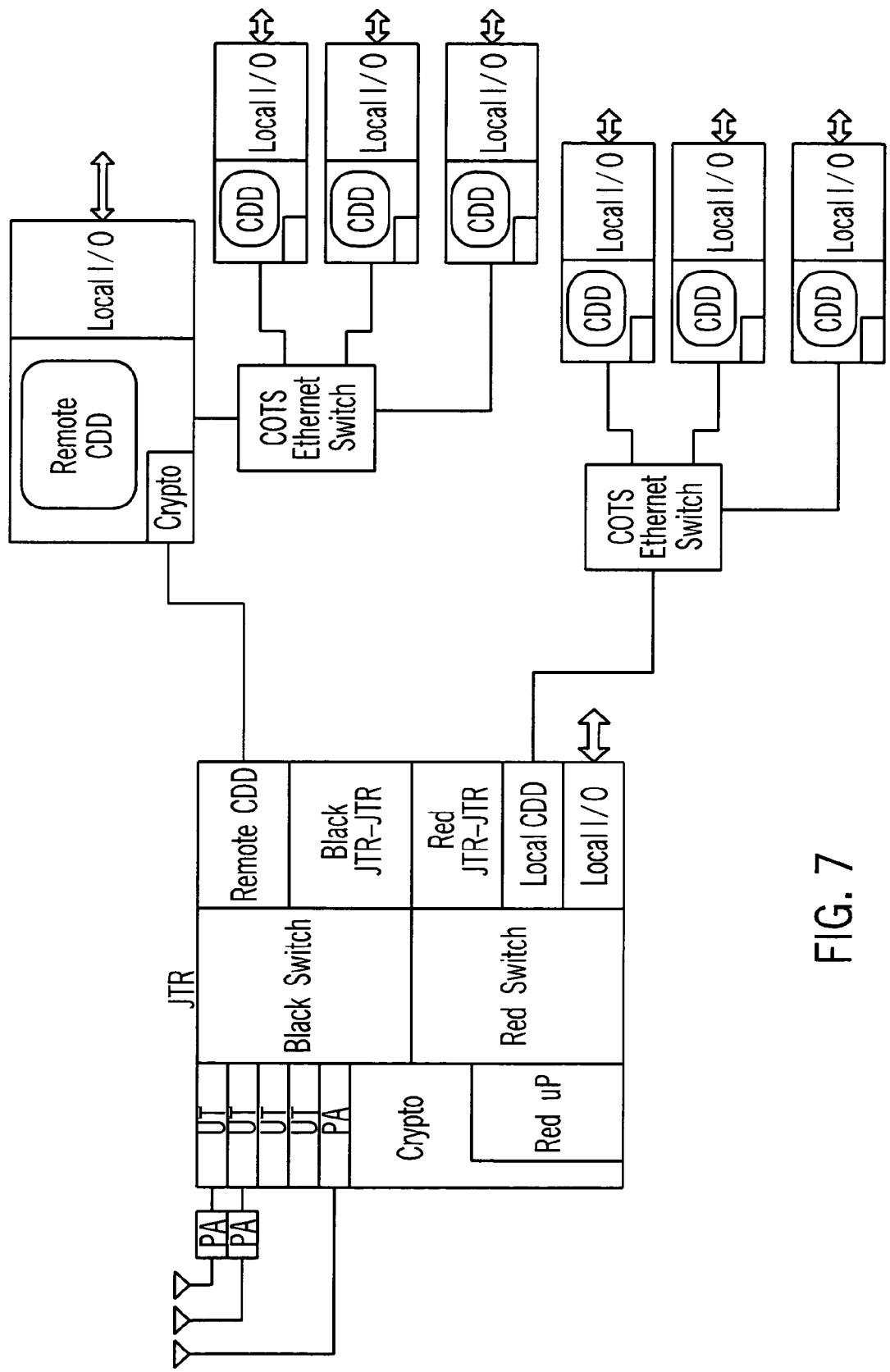
FIG. 7 is an exemplary depiction of connection options for control display devices for a Joint Tactical Radio.

Connection of multiple CDD's, as depicted in FIG. 7, may be achieved using COTS Ethernet switches. Inclusion of switches may not impact MSLS design robustness of link.

Figure 8:
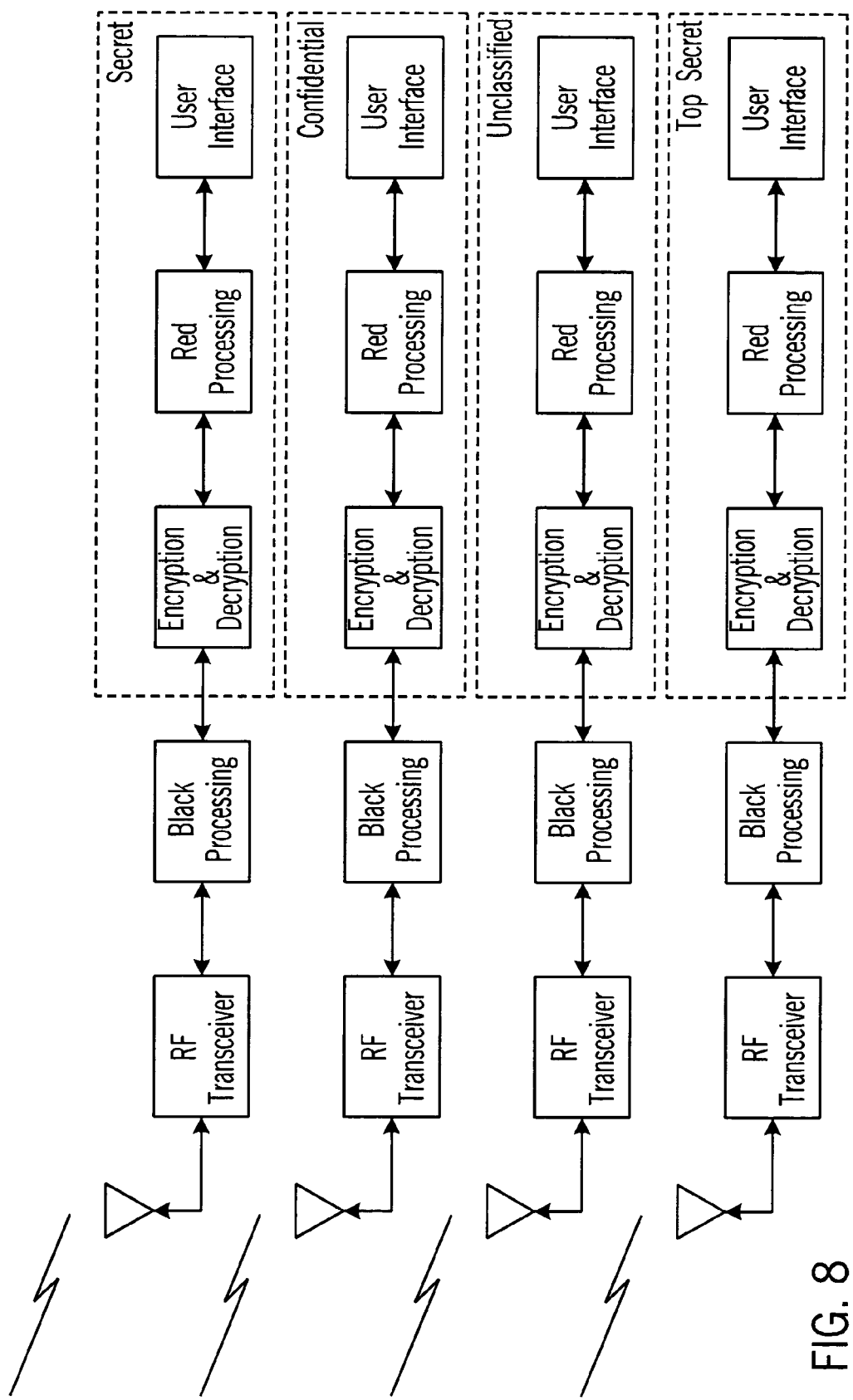
FIG. 8 is an exemplary depiction of a conventional MILS functional system.

Transmission of information containing Multiple Independent Levels of Security (MILS) is a requirement for many new military communications systems. An exemplary concept 4 as implemented in the JTRS Cluster 1 program, allows a single multi-channel radio communications system to provide voice and data services to multiple users each operating at independent security levels. There is considerable effort currently underway in validating MILS encryption devices and operating systems but little thought has been given to optimization of the information exchange within such a system. A functional block diagram of such a system is shown in FIG. 8.

Figure 9:
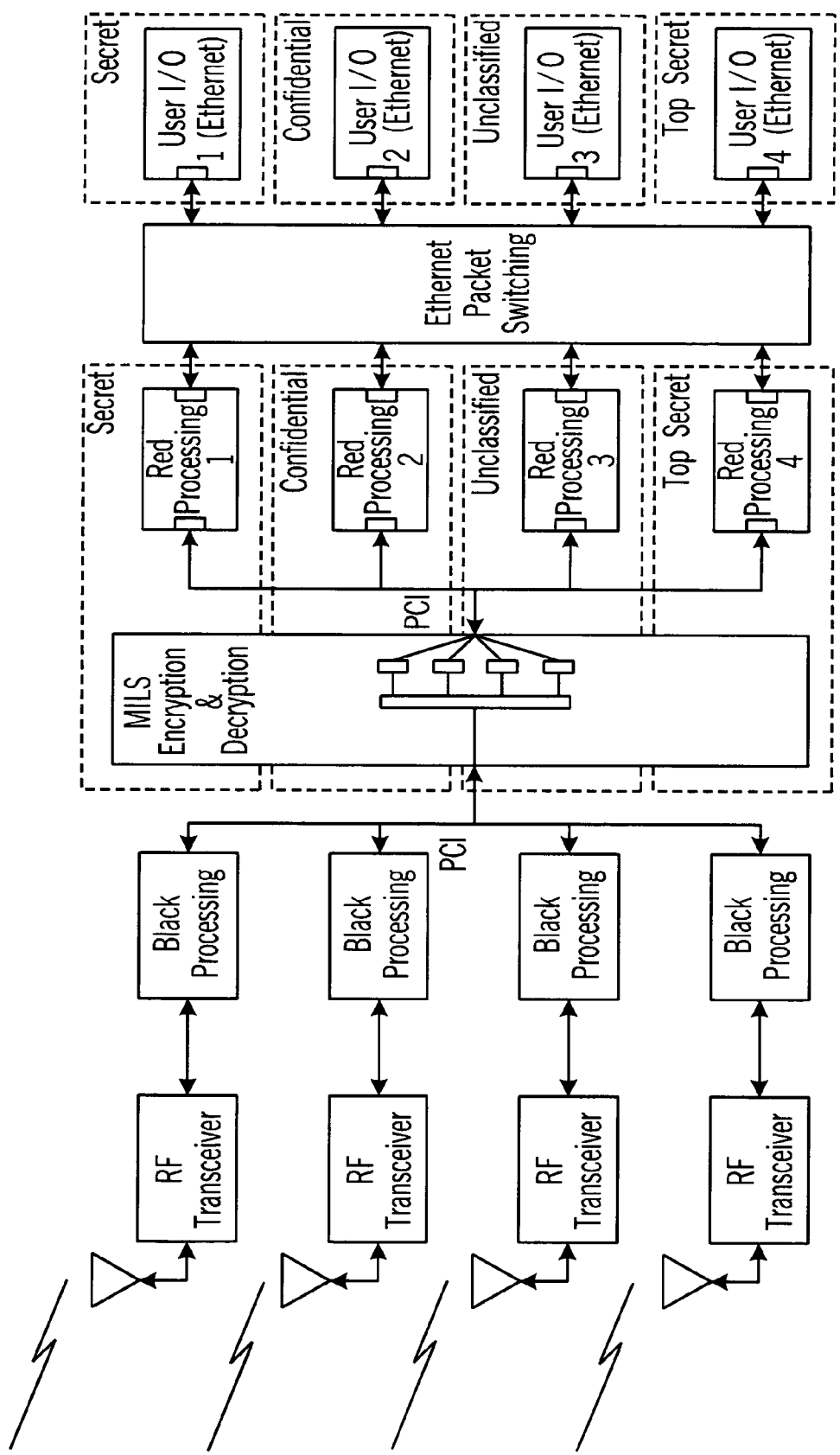
FIG. 9 is an exemplary depiction of an implementation of a MILS system.
Figure 10:
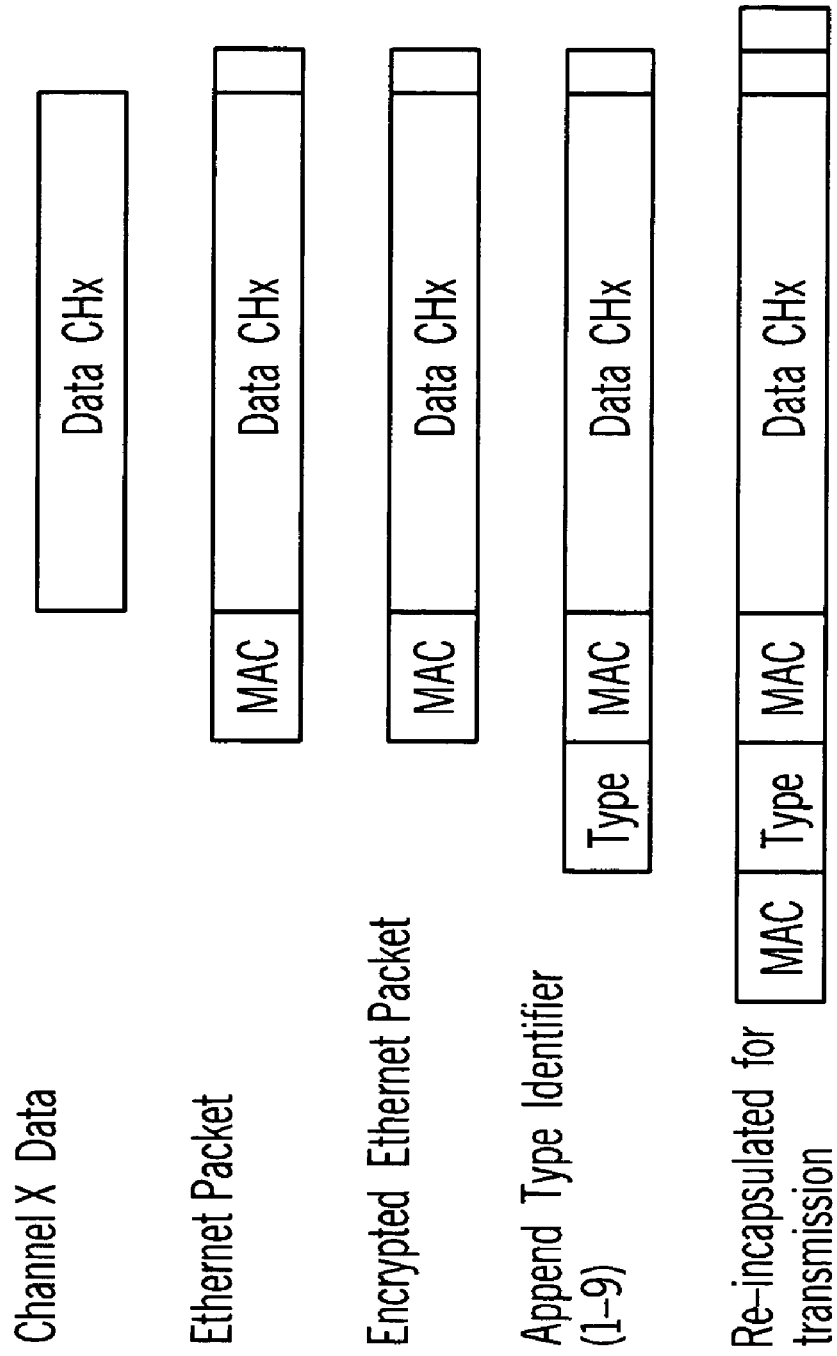
FIG. 10 is an exemplary depiction of an ethernet re-encapsulation.
Figure 11:
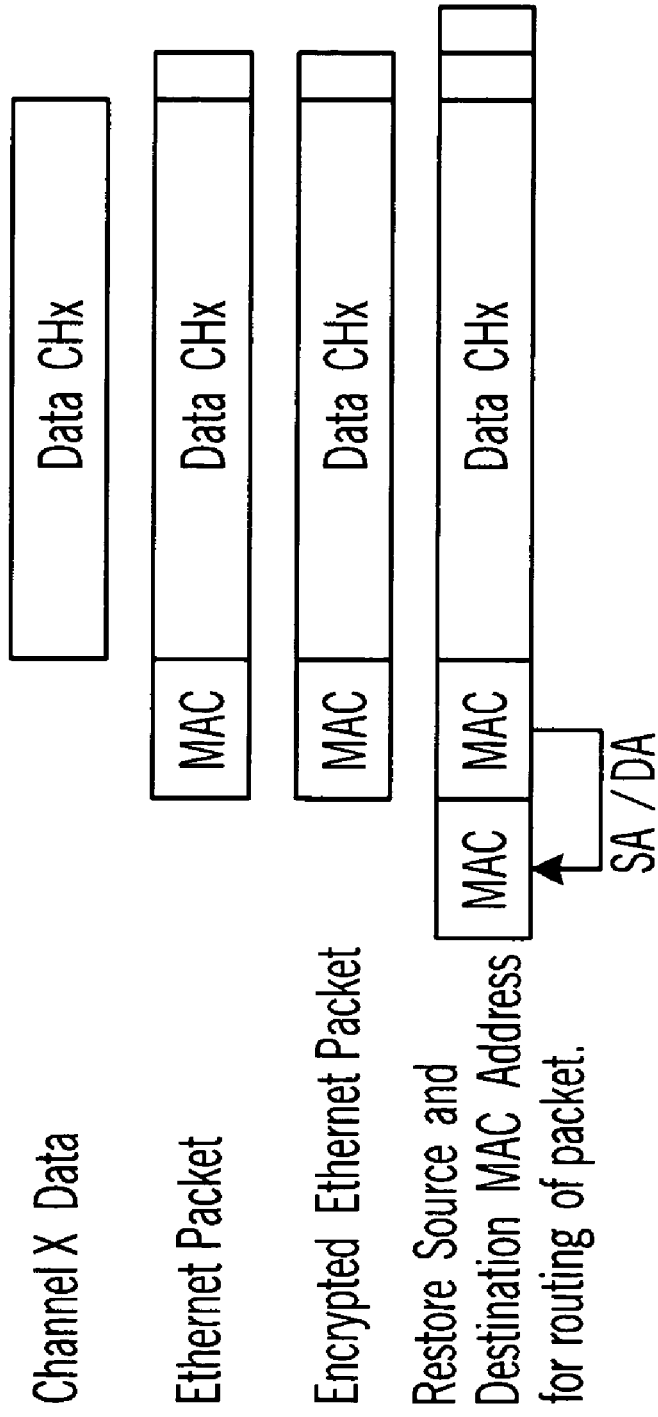
FIG. 11 is an exemplary depiction of an alternative re-encapsulation concept.

This functional implementation results in a single system providing the functionality of 4 discrete legacy "Black Box" systems. Implementing this system in a integrated hardware environment using a MILS qualified cryptographic device requires consolidation of data transfer mechanisms for simplicity and economy. FIG. 9 shows a possible implementation of the system using standard commercial off the shelf (COTS) data bus standards.

For this architecture to be capable of certification, there should be a fail-safe method on both the Red Ethernet Switch as well as the PCI bus interface which guarantees separation of data of different classifications. The method proposed is to use a codebook type encryption algorithm with a unique key for each encryption level to guarantee separation of the data. This function is denoted by the small blue boxes at the interfaces to the respective bus. The use of 4 different key pairs (User I/O 1/Red Processor 1, User I/O 2/Red Processor 2 . . . ) allows the use of a single ethernet network for interconnecting processors to User I/O and similarly allows for a single PCI interface to the cryptographic device.

This example illustrates the two basic classes of interfaces supported by this system—memory mapped and packet type interfaces. The PCI memory mapped interface is very straight-forward to implement. A Red Processor simply writes/reads a memory mapped address on the crypto and the data is automatically and transparently encrypted and decrypted at each end of the bus. The ethernet packet based interface is a bit more difficult. The total encryption of outbound packets will also encrypt the source and destination addresses of the MAC layer header making it impossible for the network switch to correctly route the packet. The packet must be re-incapsulated with a new MAC layer header as illustrated in FIG. 3. An alternate format that can be implemented in a transparent manner is illustrated in FIG. 4.

While the detailed drawings, specific examples, and particular formulations given describe preferred and exemplary embodiments, they serve the purpose of illustration only. The inventions disclosed are not limited to the specific forms shown. For example, the methods may be preformed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A multi-channel radio operating with multiple security levels, comprising:
 more than one input, each input corresponding to a security level;
 a first set of more than one processors, each of the processors in the first set of more than one processors is coupled to one of the inputs, each of the processors in the first set of more than one processors corresponding to the security level of the respective input; and
 a second set of more than one processors coupled to the first set of more than one processors via a first common bus;
 wherein a first processor in the first set encodes and encapsulates data, a data source, and a destination address to generate an encrypted outbound packet, the first processor being configured to append a channel identifier onto the encrypted outbound packet to generate a channel encrypted outbound packet, the first processor being configured to append the data source and the destination address onto the channel encrypted outbound packet and re-encapsulate the channel encrypted outbound packet;
 wherein a re-encapsulated channel encrypted outbound packet is configured to be able to be decoded by at least one processor assigned to the first security level in the second set, the re-encapsulated channel encrypted outbound packet being further configured to not be able to be decoded by at least one processor assigned to a second security level in the second set;
 wherein the first common bus is configured to direct the re-encapsulated encrypted outbound packets to the at least one processor of the second set.

2. The multi-channel radio operating with multiple security levels of claim 1, wherein the first set of more than one processors are red processing devices.

3. The multi-channel radio operating with multiple security levels of claim 1, wherein the second set of more than one processors are black processing devices.

4. The multi-channel radio operating with multiple security levels of claim 3, wherein the first set of more than one processors are red processing devices.

5. The multi-channel radio operating with multiple security levels of claim 4, wherein the first common bus is an Ethernet packet switching device.

6. The multi-channel radio operating with multiple security levels of claim 4, wherein the first common bus is a PCI bus.

7. A multi-channel radio receiving information of different security levels, comprising:
 a first set of processors, the first set of processors comprising a transform circuit, the transform circuit being configured to provide encoded data from a first channel, the encoded data being able to be decoded by processors assigned to the first channel, the encoded data is further not able to be decoded by processors assigned to a second channel, the first channel is configured to have a first information security level and the second channel is configured to have a second information security level;

a second set of processors, each of the second set of processors corresponding to either the first information security level and the second information security level; and a common bus interface coupled between the first set of processors and the second set of processors, the common bus interface configured to isolate processors of the second set of processors based on the first information security level and the second information security level wherein the first processor encodes and encapsulates data, a data source, and a destination address to generate an encrypted outbound packet, the first processor being configured to append a channel identifier onto the encrypted outbound packet to generate a channel encrypted outbound packet, the first processor being configured to append the data source and the destination address onto the channel encrypted outbound packet and re-encapsulate the channel encrypted outbound packet, wherein a re-encapsulated channel encrypted outbound packet is configured to be able to be decoded by processors assigned to the first security level, the re-encapsulated channel encrypted outbound packet being further configured to not be able to be decoded by processors assigned to the second security level.

8. The multi-channel radio of claim 7, wherein the second set of processors comprise red processing devices.

9. The multi-channel radio of claim 7, wherein the common bus interface comprises a PCI bus.

10. The multi-channel radio of claim 7, wherein the first set of processors comprise black processing devices.

11. A multi-channel radio operating with multiple security levels, comprising:
a first input corresponding to a first security level;
a second input corresponding to a second security level;
a first output corresponding to the first security level;
a second output corresponding to the second security level;
a first common bus coupled to the first input and the second input;
a first set of processors coupled to the first common bus, the first set of processors comprising a first processor corresponding to the first security level and a second processor corresponding to the second security level;
a second set of processors coupled to the first common bus, the second set of processors comprising a third processor corresponding to the first security level and a fourth processor corresponding to the second security level;
a second common bus coupled to the second set of processors, the first output, and the second output;
a first transceiver coupled to the first processor; and
a second transceiver coupled to the second processor;
wherein the first processor encodes and encapsulates data, a data source, and a destination address to generate an encrypted outbound packet, the first processor being configured to append a channel identifier onto the encrypted outbound packet to generate a channel encrypted outbound packet, the first processor being configured to append the data source and the destination address onto the channel encrypted outbound packet and re-encapsulate the channel encrypted outbound packet;
wherein a re-encapsulated channel encrypted outbound packet is configured to be able to be decoded by processors assigned to the first security level, the re-encapsulated channel encrypted outbound packet being further configured to not be able to be decoded by processors assigned to the second security level;
wherein the first common bus directs the re-encapsulated channel encrypted outbound packet to processors assigned to the first security level.

12. The multi-channel radio operating with multiple security levels of claim 11, wherein the second set of processors comprise red processing devices.

13. The multi-channel radio operating with multiple security levels of claim 11, wherein the first common bus interface comprises a PCI bus.

14. The multi-channel radio operating with multiple security levels of claim 11, wherein the first set of processors comprise black processing devices.

* * * * *